(12) United States Patent
Du et al.

(10) Patent No.: US 10,191,276 B2
(45) Date of Patent: Jan. 29, 2019

(54) IMAGING ADJUSTMENT DEVICE AND IMAGING ADJUSTMENT METHOD

(71) Applicant: Beijing Zhigu Rui Tuo Tech Co., Ltd, Beijing (CN)

(72) Inventors: Lin Du, Beijing (CN); Hongjiang Zhang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 14/780,519

(22) PCT Filed: Dec. 4, 2013

(86) PCT No.: PCT/CN2013/088522
§ 371 (c)(1),
(2) Date: Sep. 25, 2015

(87) PCT Pub. No.: WO2014/206010
PCT Pub. Date: Dec. 31, 2014

(65) Prior Publication Data
US 2016/0103318 A1    Apr. 14, 2016

(30) Foreign Application Priority Data
Jun. 28, 2013  (CN) .......................... 2013 1 0264434

(51) Int. Cl.
G02B 27/00    (2006.01)
G02B 27/01    (2006.01)
(Continued)

(52) U.S. Cl.
CPC ..... *G02B 27/0068* (2013.01); *G02B 27/0025* (2013.01); *G02B 27/0172* (2013.01);
(Continued)

(58) Field of Classification Search
CPC ............ H04N 13/0282; G02B 13/0045; G02B 27/0025; G02B 13/18; G02B 3/14;
(Continued)

(56) References Cited

U.S. PATENT DOCUMENTS 4,264,154 A    4/1981  Petersen
4,572,616 A    2/1986  Kowel et al.
(Continued)

FOREIGN PATENT DOCUMENTS

CN    1372650 A    10/2002
CN    1470227      1/2004
(Continued)

OTHER PUBLICATIONS

International Search Report dated Feb. 27, 2014 for PCT Application No. PCT/CN2013/088522, 6 pages.
(Continued)

*Primary Examiner* — Sultana M Zalalee
(74) *Attorney, Agent, or Firm* — Amin, Turocy & Watson, LLP

(57) ABSTRACT

An imaging adjustment apparatus includes: an imaging analysis module, used to determine whether a current image of an object is deformed relative to an original image of the object, and when the current image is deformed, generate imaging correction information corresponding to the deformation; an imaging lens group, used to image the object, and including a plurality of subregions having adjustable imaging parameters; and a lens adjustment module, used to adjust an imaging parameter of a corresponding subregion of the imaging lens group according to the imaging correction information. An object can be imaged by using an imaging lens in which each subregion has adjustable imaging parameters, so as to adjust the imaging parameters for each subregion separately, thereby adjusting and correcting a
(Continued)

perspective deformation that occurs on the object, preventing a perspective deformation from occurring on an image of the object acquired by a user, and improving user experience.

35 Claims, 9 Drawing Sheets

(51) Int. Cl.
- G06K 9/52 (2006.01)
- G06T 5/00 (2006.01)
- G06T 7/60 (2017.01)
- G06T 19/00 (2011.01)
- G02C 7/08 (2006.01)
- G06T 5/50 (2006.01)

(52) U.S. Cl.
CPC ............ *G02C 7/081* (2013.01); *G02C 7/083* (2013.01); *G02C 7/085* (2013.01); *G06K 9/52* (2013.01); *G06T 5/006* (2013.01); *G06T 5/50* (2013.01); *G06T 7/60* (2013.01); *G06T 19/006* (2013.01); *G02B 2027/011* (2013.01); *G06T 2207/20012* (2013.01)

(58) Field of Classification Search
CPC ...... G02B 2027/014; G02B 2027/0178; G02B 27/017; G02B 27/0075; G02B 13/08; G02B 17/0647; G02B 27/0012; G02B 27/0911; G02B 27/36; G02C 7/083; G02C 7/085; G02C 7/081; G02C 2202/16; G02C 7/02; G06K 9/52; G06T 2207/20012; G06T 5/006; G06T 7/60
See application file for complete search history.

(56) References Cited

U.S. PATENT DOCUMENTS

| | | | |
|---|---|---|---|
| 4,973,149 | A | 11/1990 | Hutchinson |
| 5,182,585 | A | 1/1993 | Stoner |
| 5,537,163 | A | 7/1996 | Ueno |
| 6,072,443 | A | 6/2000 | Nasserbakht et al. |
| 6,111,597 | A | 8/2000 | Tabata |
| 6,151,061 | A | 11/2000 | Tokuhashi |
| 6,152,563 | A | 11/2000 | Hutchison et al. |
| 6,325,513 | B1 | 12/2001 | Bergner et al. |
| 7,001,020 | B2 | 2/2006 | Yancey et al. |
| 7,298,414 | B2 | 11/2007 | Stavely et al. |
| 7,334,892 | B2 | 2/2008 | Goodall et al. |
| 7,486,988 | B2 | 2/2009 | Goodall et al. |
| 7,764,433 | B2 | 7/2010 | Kam et al. |
| 7,766,479 | B2 | 8/2010 | Ebisawa |
| 8,104,892 | B2 | 1/2012 | Hillis et al. |
| 8,109,632 | B2 | 2/2012 | Hillis et al. |
| 8,282,212 | B2 | 10/2012 | Hillis et al. |
| 8,384,999 | B1 | 2/2013 | Crosby et al. |
| 8,896,632 | B2 | 11/2014 | MacDougall et al. |
| 2002/0101568 | A1 | 8/2002 | Eberl et al. |
| 2002/0113943 | A1 | 8/2002 | Trajkovic et al. |
| 2003/0043303 | A1* | 3/2003 | Karuta ............... G02B 27/0025 348/744 |
| 2003/0125638 | A1 | 7/2003 | Husar et al. |
| 2005/0003043 | A1 | 1/2005 | Sewalt et al. |
| 2005/0014092 | A1 | 1/2005 | Hasegawa et al. |
| 2005/0030438 | A1 | 2/2005 | Nishioka |
| 2006/0016459 | A1 | 1/2006 | Mcfarlane et al. |
| 2006/0103808 | A1 | 5/2006 | Horie |
| 2006/0122530 | A1 | 6/2006 | Goodall et al. |
| 2006/0146281 | A1 | 7/2006 | Goodall et al. |
| 2006/0164593 | A1 | 7/2006 | Peyghambarian et al. |
| 2006/0122531 | A1 | 8/2006 | Goodall et al. |
| 2007/0019157 | A1 | 1/2007 | Hills et al. |
| 2007/0211207 | A1 | 9/2007 | Lo et al. |
| 2008/0002262 | A1 | 1/2008 | Chirieleison |
| 2008/0106633 | A1 | 5/2008 | Blum et al. |
| 2009/0066915 | A1 | 3/2009 | Lai |
| 2009/0189974 | A1 | 7/2009 | Deering |
| 2009/0279046 | A1 | 11/2009 | Dreher et al. |
| 2009/0303212 | A1 | 12/2009 | Akutsu et al. |
| 2011/0018903 | A1 | 1/2011 | Lapstun et al. |
| 2011/0019258 | A1 | 1/2011 | Levola |
| 2011/0213462 | A1 | 1/2011 | Holladay |
| 2011/0051087 | A1 | 3/2011 | Inoue et al. |
| 2011/0242277 | A1 | 10/2011 | Do et al. |
| 2011/0279277 | A1 | 11/2011 | Li-Chung |
| 2012/0007959 | A1 | 1/2012 | Kwon et al. |
| 2012/0013389 | A1 | 1/2012 | Thomas et al. |
| 2012/0038549 | A1 | 2/2012 | Mandella et al. |
| 2012/0092618 | A1 | 4/2012 | Yoo et al. |
| 2012/0113235 | A1 | 5/2012 | Shintani |
| 2012/0127062 | A1 | 5/2012 | Bar-Zeev et al. |
| 2012/0127422 | A1 | 5/2012 | Tian et al. |
| 2012/0133891 | A1 | 5/2012 | Jiang |
| 2012/0140044 | A1 | 6/2012 | Galstian et al. |
| 2012/0154277 | A1 | 6/2012 | Bar-Zeev et al. |
| 2012/0169730 | A1* | 7/2012 | Inoue ............... G02B 27/0093 345/419 |
| 2012/0206485 | A1 | 8/2012 | Osterhout et al. |
| 2012/0212499 | A1 | 8/2012 | Haddick et al. |
| 2012/0212508 | A1 | 8/2012 | Kimball |
| 2012/0242698 | A1 | 9/2012 | Haddick et al. |
| 2012/0290401 | A1 | 11/2012 | Neven |
| 2012/0293773 | A1 | 11/2012 | Publicover et al. |
| 2012/0307208 | A1 | 12/2012 | Trousdale |
| 2013/0044042 | A1 | 2/2013 | Olsson et al. |
| 2013/0050646 | A1 | 2/2013 | Nanbara |
| 2013/0072828 | A1 | 3/2013 | Sweis et al. |
| 2013/0093997 | A1 | 4/2013 | Utsunomiya et al. |
| 2013/0107066 | A1 | 5/2013 | Venkatraman et al. |
| 2013/0127980 | A1 | 5/2013 | Haddick et al. |
| 2013/0135203 | A1 | 5/2013 | Croughwell, III |
| 2013/0147836 | A1 | 6/2013 | Small et al. |
| 2013/0194323 | A1 | 8/2013 | Choi et al. |
| 2013/0215504 | A1 | 8/2013 | Kim et al. |
| 2013/0241805 | A1 | 9/2013 | Gomez |
| 2013/0241927 | A1 | 9/2013 | Vardi |
| 2013/0278631 | A1 | 10/2013 | Border et al. |
| 2013/0335301 | A1 | 12/2013 | Wong et al. |
| 2013/0335404 | A1 | 12/2013 | Westerinen et al. |
| 2013/0335833 | A1* | 12/2013 | Liao ............... G02B 13/0045 359/713 |
| 2013/0342572 | A1 | 12/2013 | Poulos et al. |
| 2014/0078175 | A1 | 3/2014 | Forutanpour et al. |
| 2014/0160157 | A1 | 6/2014 | Poulos et al. |
| 2014/0225915 | A1 | 8/2014 | Theimer et al. |
| 2014/0225918 | A1 | 8/2014 | Mittal et al. |
| 2014/0232746 | A1 | 8/2014 | Ro et al. |
| 2014/0240351 | A1 | 8/2014 | Scavezze et al. |
| 2014/0267400 | A1 | 9/2014 | Mabbutt et al. |
| 2014/0267420 | A1 | 9/2014 | Schowengerdt et al. |
| 2014/0282224 | A1 | 9/2014 | Pedley |
| 2014/0327875 | A1 | 11/2014 | Blum et al. |
| 2014/0354514 | A1 | 12/2014 | Aronsson |
| 2014/0375680 | A1 | 12/2014 | Ackerman et al. |
| 2015/0002542 | A1 | 1/2015 | Chan et al. |
| 2015/0035861 | A1 | 2/2015 | Salter et al. |
| 2015/0234184 | A1 | 8/2015 | Schowengerdt et al. |
| 2015/0235427 | A1 | 8/2015 | Nobori et al. |
| 2015/0235632 | A1 | 8/2015 | Liu et al. |
| 2015/0070391 | A1 | 9/2015 | Nishimaki et al. |
| 2016/0034032 | A1 | 2/2016 | Jeong |
| 2016/0035139 | A1 | 2/2016 | Fuchs et al. |
| 2016/0062454 | A1 | 3/2016 | Wang et al. |
| 2016/0171772 | A1 | 6/2016 | Ryznar et al. |
| 2016/0189432 | A1 | 6/2016 | Bar-Zeev et al. |
| 2016/0196603 | A1 | 7/2016 | Perez et al. |
| 2016/0299360 | A1 | 10/2016 | Fonte et al. |
| 2016/0370605 | A1 | 12/2016 | Ain-Kedem |
| 2017/0092235 | A1 | 3/2017 | Osman et al. |

(56) References Cited

U.S. PATENT DOCUMENTS

FOREIGN PATENT DOCUMENTS

| | | |
|---|---|---|
| CN | 1141602 C | 3/2004 |
| CN | 1527126 A | 9/2004 |
| CN | 1604014 | 4/2005 |
| CN | 1645244 A | 7/2005 |
| CN | 1653374 | 8/2005 |
| CN | 1901833 | 1/2007 |
| CN | 1912672 A | 2/2007 |
| CN | 2868183 | 2/2007 |
| CN | 1951314 | 4/2007 |
| CN | 101069106 | 11/2007 |
| CN | 101072534 | 11/2007 |
| CN | 101097293 | 1/2008 |
| CN | 101103902 | 1/2008 |
| CN | 201005945 | 1/2008 |
| CN | 101116609 | 2/2008 |
| CN | 101155258 A | 4/2008 |
| CN | 101194198 | 6/2008 |
| CN | 101430429 | 5/2009 |
| CN | 201360319 | 9/2009 |
| CN | 201352278 | 11/2009 |
| CN | 101662696 | 3/2010 |
| CN | 201464738 | 5/2010 |
| CN | 101782685 | 7/2010 |
| CN | 101819331 | 9/2010 |
| CN | 101819334 | 9/2010 |
| CN | 201637953 U | 11/2010 |
| CN | 101900927 A | 12/2010 |
| CN | 101917638 A | 12/2010 |
| CN | 201754203 | 3/2011 |
| CN | 102008288 | 4/2011 |
| CN | 102083390 | 6/2011 |
| CN | 102203850 | 9/2011 |
| CN | 102292017 | 12/2011 |
| CN | 102419631 | 4/2012 |
| CN | 102481097 | 5/2012 |
| CN | 101149254 B | 6/2012 |
| CN | 102487393 | 6/2012 |
| CN | 202267785 U | 6/2012 |
| CN | 102572483 | 7/2012 |
| CN | 102576154 A | 7/2012 |
| CN | 202383380 | 8/2012 |
| CN | 102918444 | 2/2013 |
| CN | 102939557 | 2/2013 |
| CN | 102981270 A | 3/2013 |
| CN | 103054695 | 4/2013 |
| CN | 103065605 A | 4/2013 |
| CN | 103150013 | 6/2013 |
| CN | 103190883 | 7/2013 |
| CN | 103197757 | 7/2013 |
| CN | 103280175 | 9/2013 |
| CN | 103297735 | 9/2013 |
| CN | 103353663 A | 10/2013 |
| CN | 103353667 | 10/2013 |
| CN | 103353677 | 10/2013 |
| CN | 103558909 | 2/2014 |
| DE | 19959379 | 7/2000 |
| EP | 2646859 | 10/2013 |
| JP | 03023431 | 1/1991 |
| JP | 2676870 | 11/1997 |
| JP | H09289973 | 11/1997 |
| JP | 3383228 | 3/2003 |
| JP | 2003307466 A | 10/2003 |
| JP | 2005058399 | 3/2005 |
| JP | 2007129587 A | 5/2007 |
| JP | 201143876 | 3/2011 |
| JP | 2012199621 A | 10/2012 |
| JP | 2012247449 A | 12/2012 |
| TW | 201012448 | 4/2010 |
| WO | 2004023167 | 3/2004 |
| WO | 2005077258 | 8/2005 |
| WO | 2012075218 A1 | 6/2012 |
| WO | 2012083415 | 6/2012 |
| WO | 2013074851 | 5/2013 |

OTHER PUBLICATIONS

Office Action dated Feb. 27, 2017 for U.S. Appl. No. 14/783,495, 39 pages.
Office Action dated Apr. 21, 2017 for U.S. Appl. No. 14/781,581, 19 pages.
Office Action dated Apr. 20, 2017 for U.S. Appl. No. 14/781,578, 77 pages.
Office Action dated Mar. 30, 2017 for U.S. Appl. No. 15/028,019, 36 pages.
Office Action dated May 3, 2017 for U.S. Appl. No. 14/781,306, 46 pages.
International Search report dated Jun. 12, 2014 for PCT Application No. PCT/CN2013/088554, 4 pages.
International Search Report dated Jan. 8, 2015 for PCT Application No. PCT/CN2014/088242, 2 pages.
International Search Report dated May 5, 2014 for PCT Application No. PCT/CN2013/088544, 4 pages.
International Search Report dated Jun. 5, 2014 for PCT Application No. PCT/CN2013/088549, 4 pages.
Smith, et al., "Determining Driver Visual Attention With One Camera", IEEE Transactions on Intelligent Transportation Systems, vol. 4, No. 4, Dec. 2003, 14 Pages.
Singh, et al., "Human Eye Tracking and Related Issues: A Review", International Journal of Scientific and Research Publications, vol. 2, Issue 9, Sep. 2012, ISSN 2250-3153, 9 pages.
Ji et al., "Real-Time Eye, Gaze and Face Pose Tracking for Monitoring Driver Vigilance", Real-Time Imaging 8, 357-377 (2002) available online at http://www.idealibrary.com, 21 pages.
International Search Report dated Mar. 6, 2014 for PCT Application No. PCT/CN2013/088540, 8 pages.
Jeong, et al. "Tunable microdoublet lens array", Optics Express, vol. 12, Issue 11, May 2004, pp. 2494-2500.
International Search Report dated Apr. 3, 2014 for PCT Application No. PCT1CN20131088531, 10 pages.
International Search Report dated May 28, 2014 for PCT Application No. PCT/CN2013/088545, 4 pages.
International Search Report dated May 8, 2014 for PCT Application No. PCT/CN2013/088547, 4 pages.
Kim et al., "A 200 s Processing Time Smart Image Sensor for an Eye Tracker using pixel-level analog image processing", IEEE Journal of Solid-State Circuits, vol. 44, No. 9, Sep. 2009, 10 pages.
Hansen et al., "In the eye of the beholder: a survey of models for eyes and gaze", IEEE Transactions on pattern analysis and machine intelligence, vol. 32, No. 3, Mar. 2010, 23 pages.
International Search Report dated May 28, 2014 for PCT Application No. PCT/CN2013/088553, 6 pages.
Office Action dated Jun. 29, 2017 for U.S. Appl. No. 14/783,495, 50 pages.
Office Action dated Jun. 29, 2017 for U.S. Appl. No. 14/783,503, 120 pages.
Gao et al. "Measuring Directionality of the Retinal Reflection with a Shack-Hartmann Wavefront Sensor", Dec. 2009, Optics Express, vol. 17, No. 25, Optical Society of America, 20 pages.
Office Action dated Jun. 8, 2017 for U.S. Appl. No. 14/779,968, 79 pages.
Office Action dated Oct. 4, 2017 for U.S. Appl. No. 14/781,584, 95 pages.
Office Action dated Dec. 19, 2017 for U.S. Appl. No. 14/783,503, 78 pages.
Office Action dated Nov. 9, 2017 for U.S. Appl. No. 14/781,578, 64 pages.
Office Action dated Nov. 17, 2017 for U.S. Appl. No. 14/783,495, 32 pages.
Office Action dated Dec. 14, 2017 for U.S. Appl. No. 14/779,321, 82 pages.
Office Action dated Dec. 15, 2017 for U.S. Appl. No. 14/779,968, 67 pages.
Lee et al. "A Robust Eye Gaze Tracking Method Based on a Virtual Eyeball Model", Machine Vision and Applications, (2009) 20:319-337, Springer-Verlag, 2008. 19 pages.
Office Action dated Feb. 5, 2018 for U.S. Appl. No. 14/779,321, 38 pages.

(56) References Cited

OTHER PUBLICATIONS

Office Action dated Jun. 29, 2018 for U.S. Appl. No. 14/781,578, 67 pages.
Office Action dated Jun. 25, 2018 for U.S. Appl. No. 14/779,321, 43 pages.
Office Action dated Jul. 13, 2018 for U.S. Appl. No. 14/783,495, 36 pages.
Office Action dated Jul. 17, 2018 for U.S. Appl. No. 14/781,584, 75 pages.
Office Action dated Sep. 20, 2018 for U.S. Appl. No. 14/779,968, 71 pages.
Notice of Allowance dated Nov. 20, 2018 for U.S. Appl. No. 14/779,321, 31 pages.

\* cited by examiner

_US 10,191,276 B2_

IMAGING ADJUSTMENT DEVICE AND IMAGING ADJUSTMENT METHOD

RELATED APPLICATION

This application is a U.S. National Stage filing under 35 U.S.C. § 371 of International Patent Cooperation treaty (PCT) application No. PCT/CN2013/088522, filed Dec. 4, 2013, and entitled "IMAGING ADJUSTMENT DEVICE AND IMAGING ADJUSTMENT METHOD," which claims priority to Chinese Patent Application No. 201310264434.8, filed with the Chinese Patent Office on Jun. 28, 2013 and entitled "IMAGING ADJUSTMENT APPARATUS AND METHOD", which applications are hereby incorporated herein by reference in their respective entireties.

TECHNICAL FIELD

The subject application relates to the field of imaging technologies, and more particularly to imaging adjustment.

BACKGROUND

A Galilean telescope can form an upright virtual image 1030a of an observed object 1030 and change an included angle from the virtual image to eyes by using a convex lens 1010 and a concave lens 1020, so as to achieve a visual effect of drawing near or pushing away the observed object along an optical axis 1040. The magnification factor can be changed and focusing can be implemented by adjusting focal lengths of the two lenses and a distance between the lenses, as shown in FIG. 12a to FIG. 12c.

A lens with a fixed focal length has found wide applications in optical devices such as glasses, telescopes, cameras, and microscopes, and by combining lenses of different focal lengths and adjusting a distance between the lenses, a focal length can be dynamically adjusted for a lens group. In addition, for new-type lenses with an electronically adjustable focal length, the focal length of a single lens can also be dynamically adjusted.

Wearable devices such as Google glass and smartwatches are gradually accepted by people, and these electronic smart devices will make people's life more and more convenient.

When a user watches or records an image of an object, a perspective deformation may occur on a received image of the object relative to an original image of the object in a case where the user is not right in front of the object. In addition, it is possible that the user watches or records an image of the object that is collected by an image collection device and directly displayed, or an image that is collected and then projected on a screen by using an image projection device, and therefore, in the process of image collection and/or image projection, a perspective deformation may occur on the image of the object watched or recorded by the user relative to the original image of the object because the image collection device fails to collect the image right from front, and/or the projection device fails to project the image right on the screen.

If the foregoing perspective deformation can be directly adjusted during imaging through imaging lenses, an image with no perspective deformation or a slight degree of perspective deformation of an object can be directly obtained, thereby greatly improving user experience.

SUMMARY

A technical problem to be solved by one or more embodiments of the subject application is to provide an imaging adjustment apparatus and method, so as to solve or mitigate the problem of a perspective deformation for an object during imaging.

In a first aspect, the subject application provides an imaging adjustment apparatus, which includes:

an imaging analysis module, used to determine whether a current image of an object is deformed relative to an original image of the object, and when the current image is deformed, generate imaging correction information corresponding to the deformation;

an imaging lens group, used to image the object, and including a plurality of subregions having adjustable imaging parameters; and a lens adjustment module, used to adjust at least one imaging parameter of a corresponding subregion of the imaging lens group according to the imaging correction information.

In a second aspect, the subject application provides an imaging adjustment method, which includes:

determining whether a current image of an object is deformed relative to an original image of the object, and when the current image is deformed, generating imaging correction information corresponding to the deformation; and adjusting at least one imaging parameter of at least one corresponding subregion of an imaging lens group according to the imaging correction information, where the imaging lens group includes a plurality of subregions having adjustable imaging parameters.

In technical solutions of embodiments of the subject application, an object is imaged by using an imaging lens in which each subregion has adjustable imaging parameters, so as to adjust the imaging parameters for each subregion separately, thereby adjusting and correcting a perspective deformation that occurs on the object, preventing a perspective deformation from occurring on an image of the object acquired by a user, and improving user experience. The subject application is particularly applicable to a case where a user watches a program on a screen at a position with an undesirable angle. In addition, the method and apparatus in embodiments of the subject application also further mitigate the problem of a refractive error of a user's eyes through adjusting the imaging parameters of each subregion.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The imaging adjustment apparatus and method of the subject application are illustrated below in detail with reference to the accompanying drawings and embodiments.

Figure 1:
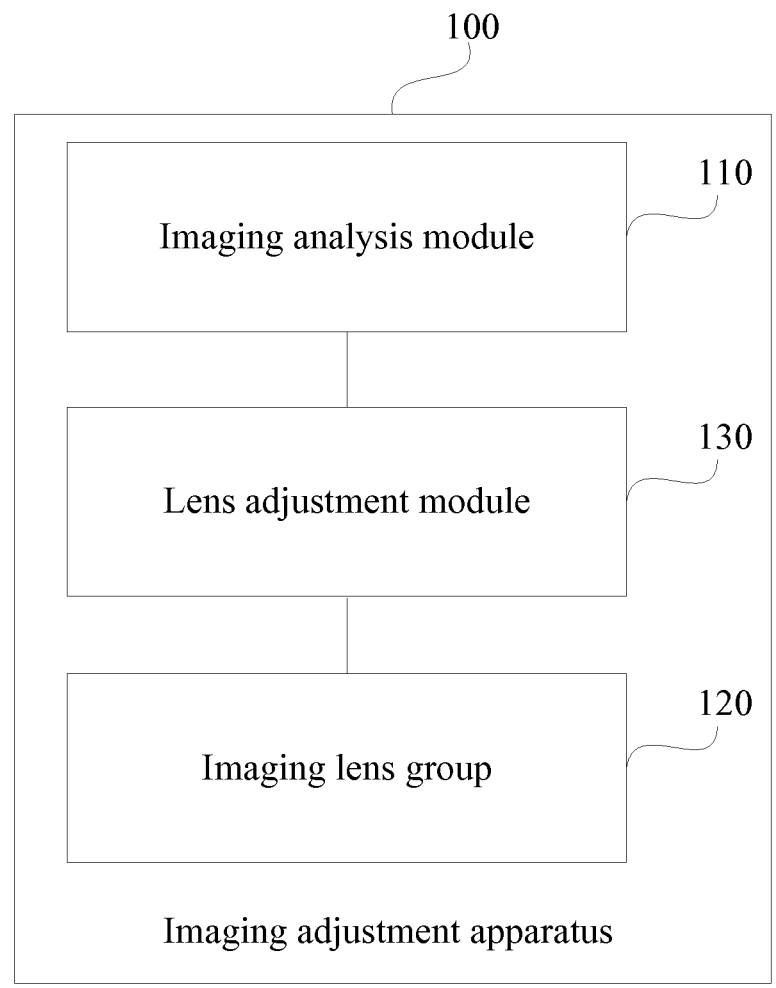
FIG. 1 is a schematic structural view of an imaging adjustment apparatus according to an embodiment of the subject application.

As shown in FIG. 1, an embodiment of the subject application provides an imaging adjustment apparatus 100, which includes:

an imaging analysis module 110, used to determine whether a current image of an object is deformed relative to an original image of the object, and when the current image is deformed, generate imaging correction information corresponding to the deformation;

an imaging lens group 120, used to image the object, and including a plurality of subregions having adjustable imaging parameters; and a lens adjustment module 130, used to adjust an imaging parameter of a corresponding subregion of the imaging lens group 120 according to the imaging correction information.

Here, the original image of the object may be, for example, a front-view image of the object obtained right from front of the object, or an image obtained by a projector through projection on a screen from front, and the like.

Here, the plurality of subregions having adjustable imaging parameters may be subregions physically independent from each other, or may also be subregions obtained by logically dividing a part that is practically a whole physically.

An embodiment of the subject application adjusts an imaging parameter of a corresponding subregion of the imaging lens group 120 based on a deformation of a current image of an object, so as to correct the deformation of the current image of the object, thereby obtaining an image that is closer to a front view of the object, and improving user experience.

Figure 2A:
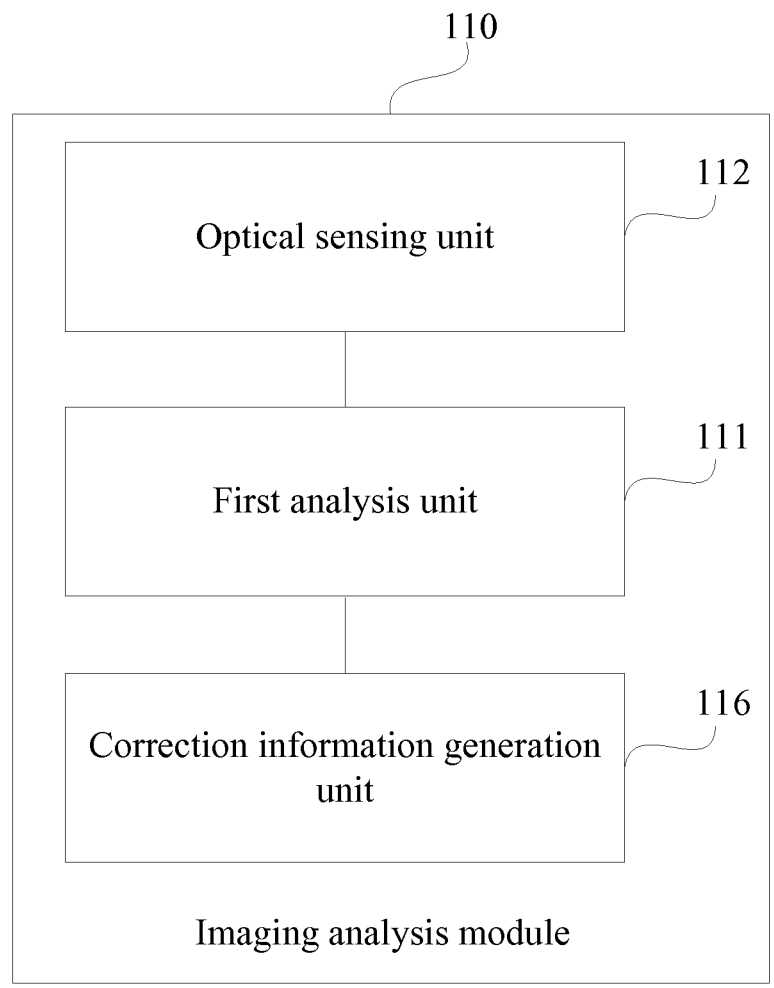
FIG. 2a is a schematic structural view of an imaging analysis module in an imaging adjustment apparatus according to an embodiment of the subject application.

As shown in FIG. 2a, in a possible implementation manner of an embodiment of the subject application, the imaging analysis module 110 includes:

a first analysis unit 111, used to determine whether the current image of the object is deformed relative to the original image of the object according to current image information of the object and preset information of the object, and when the deformation occurs, generate deformation information.

In this implementation manner, the preset information of the object includes: shape information of an outer profile of the object. In a possible implementation manner of an embodiment of the subject application, the outer profile of the object is a rectangle, and the shape information of the outer profile of the object includes aspect ratio information of the outer profile of the object.

Here the preset information of the object may be manually set by a user, or may also be automatically obtained by the apparatus (for example, may be obtained from the side of the object).

Figure 2B:
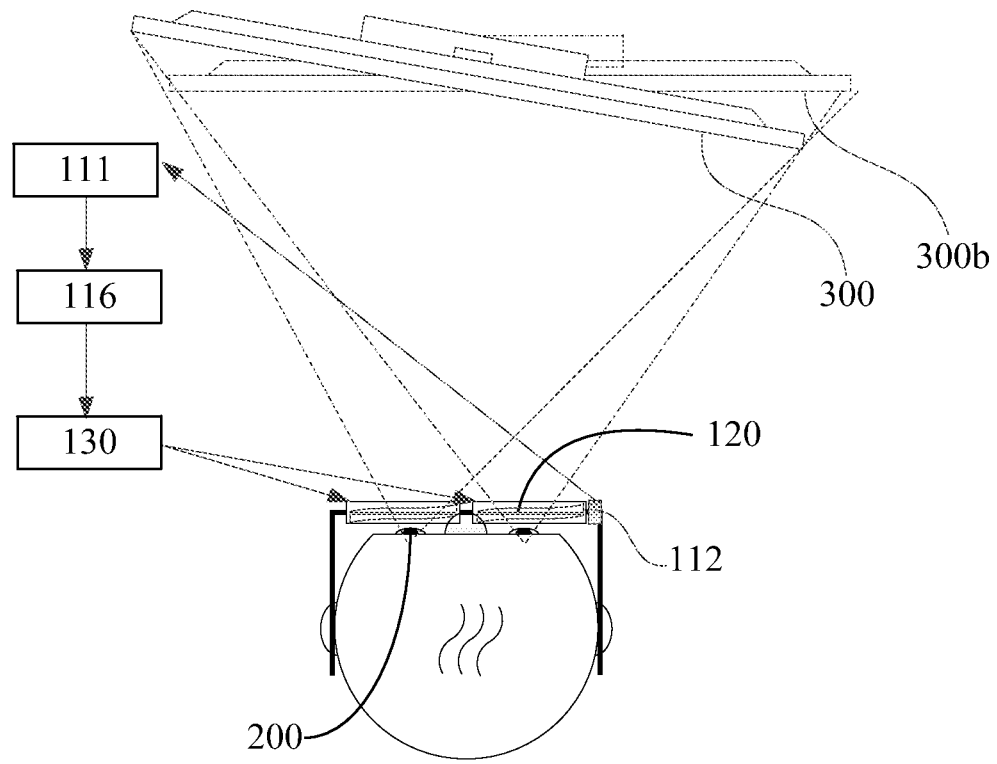
FIG. 2b is a schematic view of an application scenario of an imaging adjustment apparatus according to an embodiment of the subject application.

As shown in FIG. 2b, this implementation manner uses the object being a display device 300 as an example to describe an embodiment of the subject application. An outer profile of a display surface of the display device 300 usually has a fixed size. For example, it is known that the aspect ratio of the display surface of a 19-inch widescreen display device 300 is 16:9. When a user watches a picture displayed by the display device 300, the preset information of the object like that the display device 300 is a rectangle with a specific aspect ratio can be preset, or the display device 300 sends the shape information thereof to the apparatus automatically. When the received current image information of the object does not match the preset information of the object, for example, a phenomenon that an image of an object that is supposed to be a rectangle turns into a trapezoid occurs, it can be determined that the current image of the object is deformed relative to the original image of the object, and corresponding deformation information is generated.

Definitely, other than the foregoing information about the outer profile being a rectangle, the outer profile of the object may further be in other shapes, for example, is circular. If the received current image of the object is elliptic, it can be determined that a perspective deformation occurs on the object.

Figure 3A:
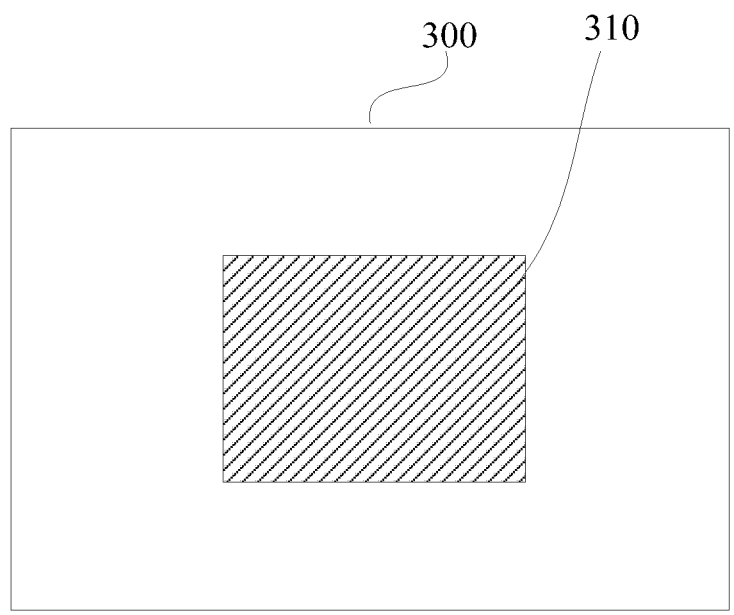
FIG. 3a and FIG. 3b are schematic views of a reference pattern in an object before deformation and after deformation of an imaging adjustment apparatus according to an embodiment of the subject application.
Figure 3B:
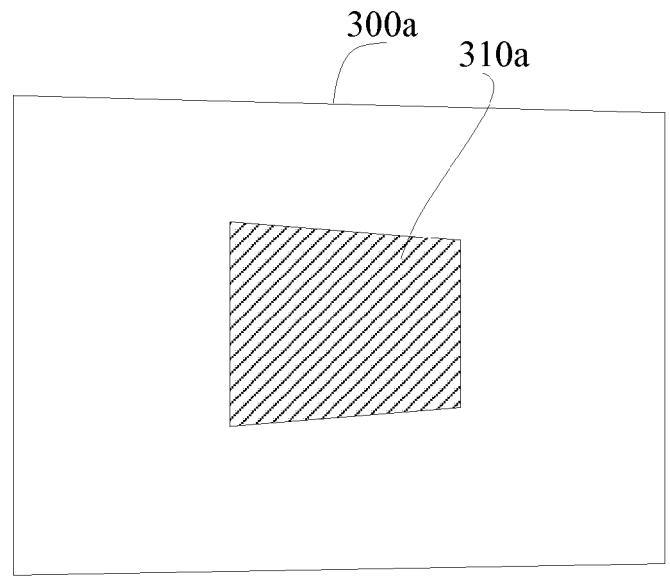

In another possible implementation manner of an embodiment of the subject application, the preset information of the object includes: information of a reference pattern in the object. For example, still the object being the display device is used as an example for illustration. As shown in FIG. 3a and FIG. 3b, a reference pattern 310 (for example, a rectangle with a known aspect ratio or a circle) is displayed in the display device 300. Next, a user can determine whether a deformation occurs according to a received current image 310a of the reference pattern (as shown in FIG. 3b, the current image 310a of the reference pattern in the current image 300a of the display device turns into a trapezoid that is large on the left and small on the right, and a deformation occurs as compared with the rectangle of the reference pattern 310). Here, the reference pattern data may be prestored in the apparatus of an embodiment of the subject application and is sent to the display device to display, or also may be prestored in the display device and is controlled to display when needed, or can further be acquired through a network.

As shown in FIG. 2a and FIG. 2b, in a possible implementation manner of an embodiment of the subject application, the imaging analysis module 110 further includes: an optical sensing unit 112, used to acquire the current image information of the object. In a possible implementation manner of an embodiment of the subject application, the optical sensing unit 112 may be a camera, and acquire the current image of the object and transfer the current image of the object to the first analysis unit 111.

As shown in FIG. 2, preferably, in this implementation manner, the imaging analysis module 110 includes: a correction information generation unit 116, used to generate imaging correction information corresponding to the deformation according to the deformation information. In a possible implementation manner of an embodiment of the subject application, the imaging correction information may be: adjustment information for one or more imaging parameters of a corresponding subregion, for example, adjustment information of increasing or decreasing a focal length of one or more subregions corresponding to a part of an imaging lens group by a value.

In a possible implementation manner of an embodiment of the subject application, the imaging lens group 120 includes at least two lenses, and a part corresponding to each subregion of the at least one lens of the at least two lenses has an adjustable imaging parameter.

Figure 4:
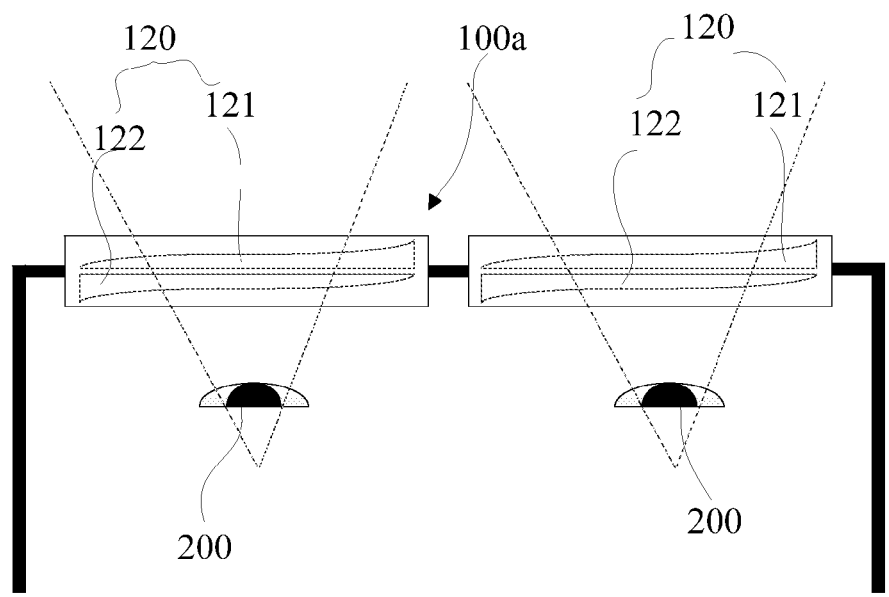
FIG. 4 is a schematic structural view of an imaging lens group of an imaging adjustment apparatus according to an embodiment of the subject application.

As shown in FIG. 4, in a possible implementation manner of an embodiment of the subject application, the imaging receiver is a user's eyes 200, and the imaging adjustment apparatus is glasses 100a (here, except common glasses, the glasses may also be optical devices such as goggles and windshields). In other implementation manners, the imaging receiver may be an imaging recording apparatus such as a video recorder or a camera. The imaging adjustment apparatus may further be a front lens device of the imaging recording apparatus. The relative positions of the user's eyes and the imaging adjustment apparatus and the relative positions of the imaging recording apparatus and the imaging adjustment apparatus can be obtained through automatic or manual calibration.

In this embodiment, the following illustration mainly uses an example that the imaging adjustment apparatus is glasses.

As shown in FIG. 4, in this embodiment, the imaging lens group 120 includes a first lens 121 near an object and a second lens 122 far from the object, and a part corresponding to each subregion of the first lens 121 and the second lens 122 has an adjustable imaging parameter.

In a possible implementation manner of the embodiment of the subject application, the imaging parameter includes: a focal length. In this embodiment, the adjustment to the focal length of each subregion may be: 1) The focal length of the subregion is adjusted through adjusting the curvature of at least one surface of each subregion; for example, the curvature of a subregion is adjusted by increasing or reducing a liquid medium in a cavity formed by double transparent layers, and in this case, the imaging correction information may be, for example: reducing or increasing the liquid medium of a part corresponding to a subregion by a value. 2) The focal length of a subregion is adjusted through changing the refractive index of the subregion; for example, a specific liquid crystal medium is filled in each subregion, and the arrangement manner of the liquid crystal medium is adjusted through adjusting the voltage of a corresponding electrode of the liquid crystal medium, so as to change the refractive index of the subregion; and in this case, the imaging correction information may be, for example: increasing or reducing the voltage of an electrode of a part corresponding to a subregion by a value.

In a possible implementation manner of an embodiment of the subject application, except the focal length, the imaging parameter further includes: the relative positions of lenses. Here, the relative positions of lenses can be changed through adjusting a relative distance between lenses along an optical axis direction, and/or relative positions along a vertical optical axis direction, and/or a relative rotational angle about an optical axis. Definitely, it is also possible that only relative positions of parts corresponding to some subregions on a lens are changed, and other parts are not changed.

Preferably, as shown in FIG. 4, the first lens 121 of the imaging lens group 120 is set to be that the curvature of a side facing the object is adjustable, and the second lens 122 is set to be that the curvature of a side facing the user's eyes 200 is adjustable, and the positions of the first lens 121 and the second lens 122 are fixedly set, so that the wearable device has a simple structure and is light and portable.

Preferably, in a possible implementation manner of an embodiment of the subject application, the plurality of subregions having adjustable imaging parameters is distributed in an array. Preferably, the imaging plane of the imaging lens group is divided in a mesh form to obtain the plurality of subregions. The plurality of subregions may have a same size, or may also be different in size. Generally speaking, when the subregions are divided smaller, the precision of adjustment is higher.

Figure 5:
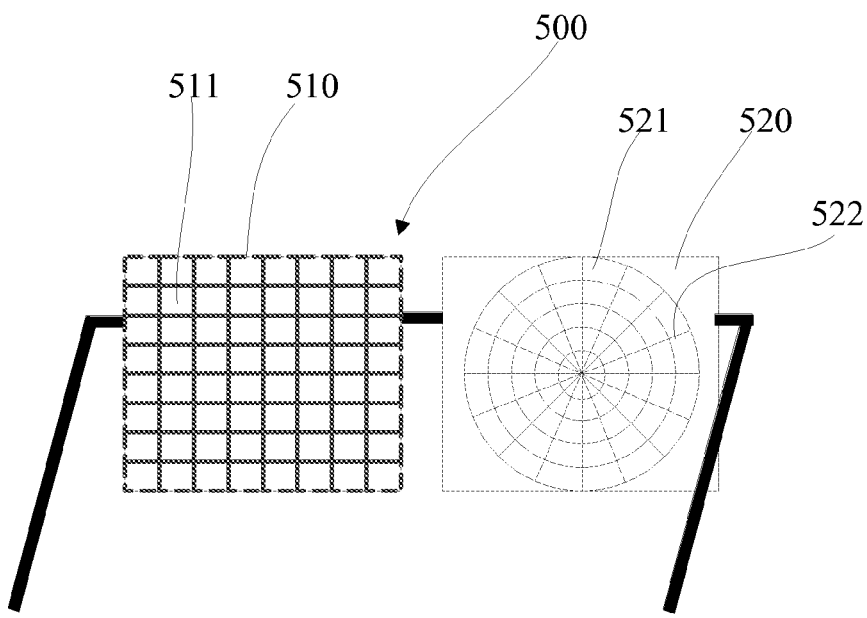
FIG. 5 is a schematic view of the distribution of subregions of an imaging lens group of an imaging adjustment apparatus according to an embodiment of the subject application.

As shown by an imaging lens group 510 on the left side of an imaging adjustment apparatus 500 in FIG. 5, in a possible implementation manner of an embodiment of the subject application, the plurality of subregions 511 having adjustable imaging parameters is distributed in a rectangular array. In this embodiment, the subregions 511 have the same size and are arranged in aligned rows and columns. In other embodiments, the subregions may also be arranged in staggered rows and columns.

As shown by the imaging lens group 520 on the right side of the imaging adjustment apparatus 500 in FIG. 5, the plurality of subregions 521 having adjustable imaging parameters is distributed in a radially concentric (formed by several concentric circles and several radial lines connecting adjacent concentric circles in a radial direction) array. In this embodiment, the radial lines 522 of the radial concentric circles are arranged in an aligned manner. In other embodiments, radial lines between every two adjacent concentric circles may also be arranged in a nonaligned manner.

In FIG. 5 of this implementation manner, for the need of description, the imaging lens groups 520 of two different kinds of distribution of subregions are placed in one same pair of glasses. In a practical application, a pair of glasses usually has the same or similar distribution of subregions for the left and right imaging lens groups.

Definitely, a person skilled in the art shall understand that in addition to the foregoing rectangular array and radially concentric array, the subregions may further be distributed in another type of array or not in an array.

As shown in FIG. 2b, the user is not right in front of the display device 300. The optical sensing unit 112 acquires the current image of the display device 300 and transfers the current image to the first analysis unit 111 for analysis. The first analysis unit 111 determines that a perspective deformation occurs on the current image of the display device 300 relative to the original image of the display device 300, generates corresponding deformation information, and sends the deformation information to the correction information generation unit 116. The correction information generation unit 116 generates corresponding imaging correction information according to the deformation information, and then sends the imaging correction information to the lens adjustment module 130. The lens adjustment module 130 adjusts an imaging parameter of a corresponding subregion of the imaging lens group 120 according to the imaging correction information, and eventually enables that the position where the user's eyes 200 watch the object image 300*b* of the display device is shown in FIG. 2*b*. As can be seen from the above, by means of the imaging adjustment apparatus 100 of the subject application, a deformed image of the object is corrected in real time, which enables a user at an undesirable position to also obtain a visual effect as being right in front of the object, thereby improving user experience.

Figure 6:
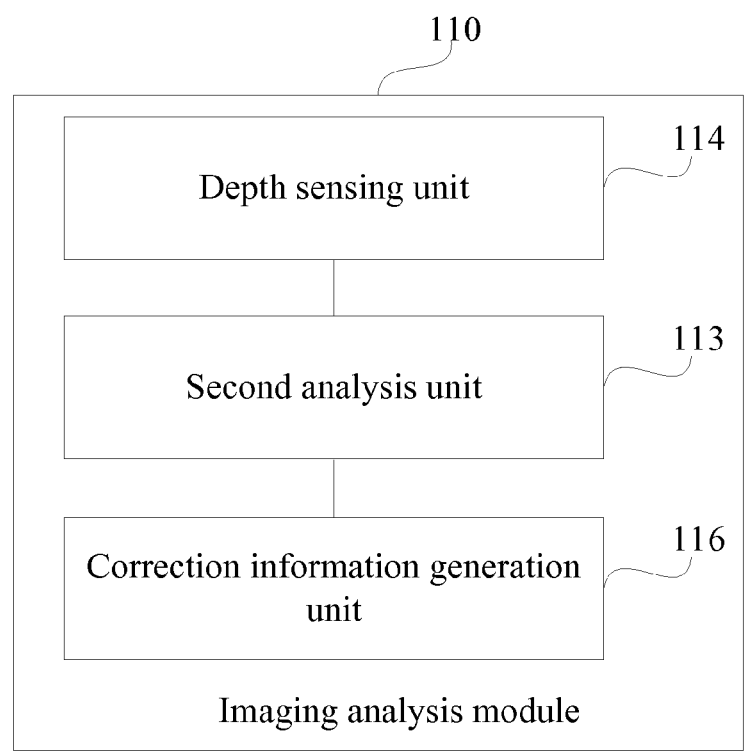
FIG. 6 is a schematic structural view of an imaging analysis module in another imaging adjustment apparatus according to an embodiment of the subject application.

As shown in FIG. 6, in another possible implementation manner of an embodiment of the subject application, the difference between other structures and the structure shown in FIG. 2*b* lies in that, this implementation manner uses the second analysis unit 113 to replace the first analysis unit in FIG. 2*b*. Specifically, in this implementation manner, the imaging analysis module 110 includes: a second analysis unit 113, used to generate corresponding deformation information according to depth information of the object relative to the imaging adjustment apparatus.

Because in this embodiment the deformation of the current image of the object relative to the original image of the object is mainly a perspective deformation caused by that the apparatus is not right in front of the object, by detecting the depth information of the object relative to the imaging adjustment apparatus 100 (that is, the distance of the object relative to the imaging adjustment apparatus), when it is obtained that the parts of the object have different depths relative to the apparatus, it may be determined that the current image of the object is deformed relative to the original image of the object, and deformation information corresponding to the deformation may be generated according to the depth information and the size information of the object. Here, the deformation information may be the depth of a different position of the object relative to the imaging adjustment apparatus 100.

Preferably, in this implementation manner, the imaging analysis module 110 includes: a depth sensing unit 114, used to acquire the depth information of the object relative to the imaging adjustment apparatus 100.

Figure 7:
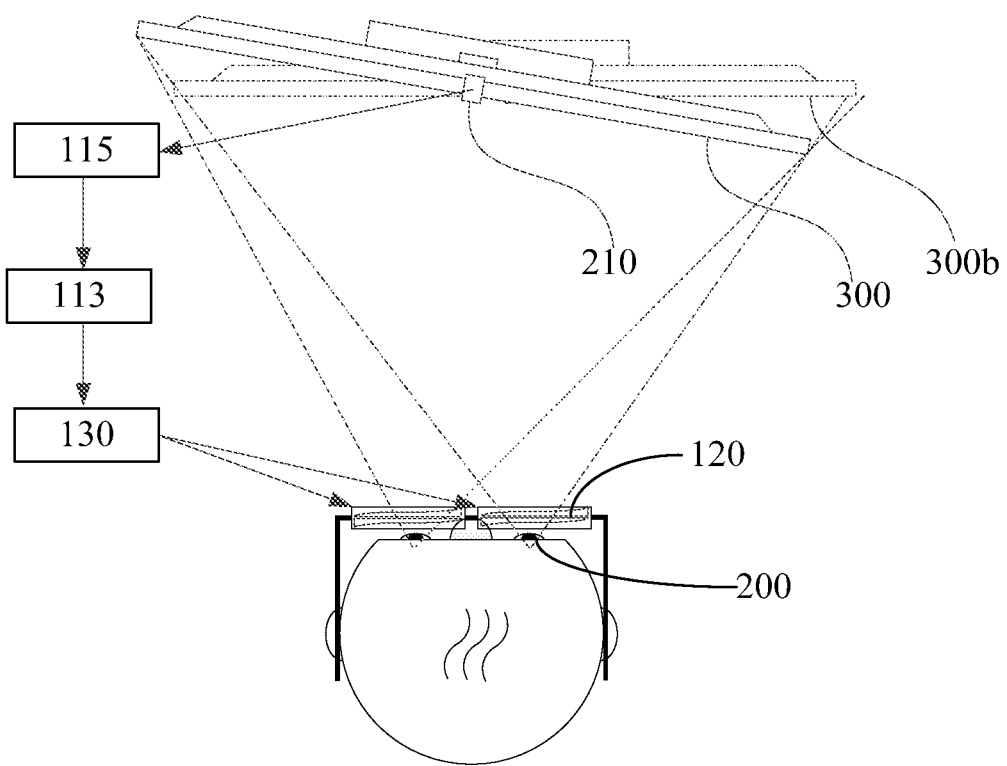
FIG. 7 is a schematic view of an application scenario of yet another imaging adjustment apparatus according to an embodiment of the subject application.

As shown in FIG. 7, in another possible implementation manner of an embodiment of the subject application, the imaging analysis module 110 includes: an information receiving unit 115, used to receive the depth information of the object relative to the imaging adjustment apparatus 100.

Different from the above that the depth sensing unit 114 is directly disposed on the imaging adjustment apparatus 100, in this implementation manner, a depth sensor 210 is provided at the side of the object, and is used to detect the depth information of the object relative to the imaging adjustment apparatus 100, and then transfer the depth information to the imaging adjustment apparatus 100 through the information receiving unit 115.

Figure 8:
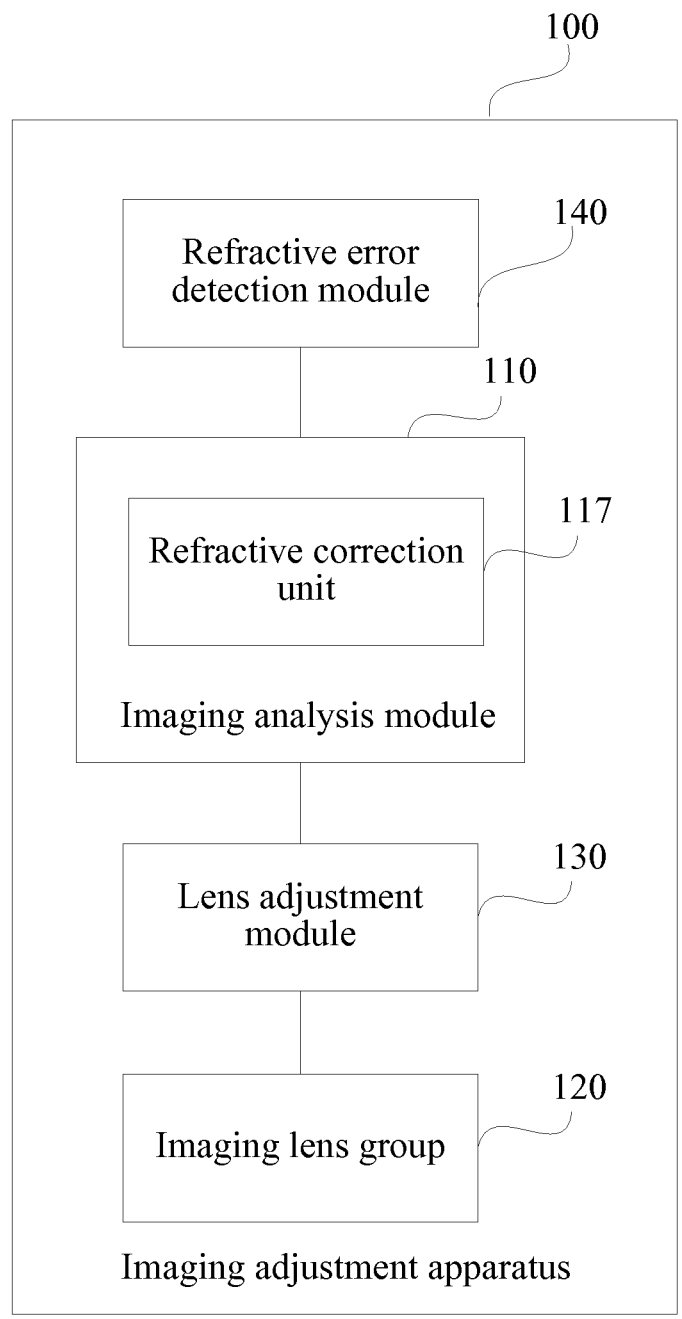
FIG. 8 is a schematic structural view of a further imaging adjustment apparatus according to an embodiment of the subject application.

As shown in FIG. 8, in a possible implementation manner of an embodiment of the subject application, based on any implementation manner above, the imaging analysis module 110 further includes:

a refractive correction unit 117, used to, when a refractive error occurs on an imaging receiver, generate imaging correction information corresponding to the refractive error.

In a possible implementation manner of an embodiment of the subject application, the imaging adjustment apparatus 100 further includes: a refractive error detection module 140, used to detect whether a refractive error occurs on the imaging receiver, and when it is detected that an error occurs, send the refractive error information to the refractive correction unit 117.

In a possible implementation manner of an embodiment of the subject application, the imaging receiver is a user's eyes. When a user has refractive error problems such as hyperopia, myopia and/or astigmatism, the user may enable the refractive correction unit 117 to generate corresponding imaging correction information through manual settings, so as to mitigate the refractive error problem.

In a possible implementation manner of an embodiment of the subject application, data transmission between the imaging analysis module and the lens adjustment module is preferably performed in a wireless communication manner. Data transmission between units in the imaging analysis module is also preferably performed in a wireless communication manner.

In a possible implementation manner of an embodiment of the subject application, the functions of the imaging analysis module may be implemented by a processor. The processor may be a central processing unit (CPU), or an application specific integrated circuit (ASIC), or one or more integrated circuits configured to implement an embodiment of the subject application. The functions of the imaging analysis module are implemented by one or more programs executed by the processor. The imaging analysis module may further include a memory, which is used to store the program. The memory may contain a high-speed random access memory (RAM) memory, or may also further contain a non-volatile memory, for example, at least one disk memory.

Figure 9:
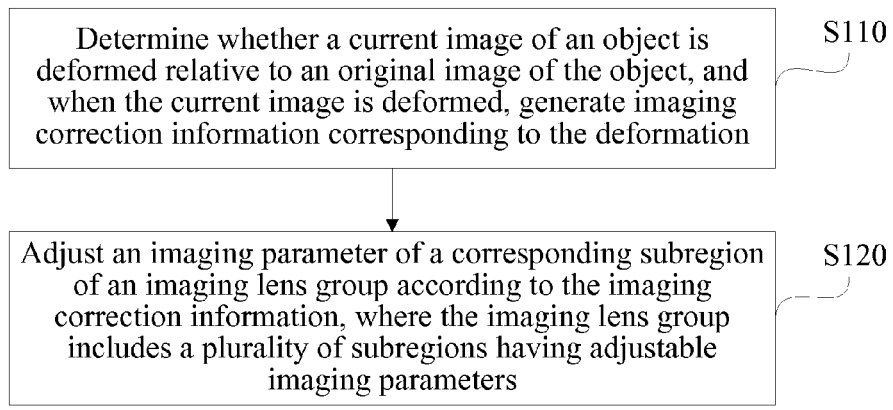
FIG. 9 is a schematic flow chart of embodiment of an imaging adjustment method according to an embodiment of the subject application.

As shown in FIG. 9, an embodiment of the subject application provides an imaging adjustment method, which includes:

S110: Determine whether a current image of an object is deformed relative to an original image of the object, and when the current image is deformed, generate imaging correction information corresponding to the deformation.

S120: Adjust an imaging parameter of a corresponding subregion of an imaging lens group according to the imaging correction information, where the imaging lens group includes a plurality of subregions having adjustable imaging parameters.

In a possible implementation manner of an embodiment of the subject application, preferably, the step of determining whether a current image of an object is deformed relative to an original image of the object includes:

determining whether the current image of the object is deformed relative to the original image of the object according to current image information of the object and preset information of the object, and when the deformation occurs, generating deformation information.

In a possible implementation manner of an embodiment of the subject application, preferably, the preset information of the object includes: shape information of an outer profile of the object.

In a possible implementation manner of an embodiment of the subject application, preferably, the outer profile of the object is a rectangle, and the shape information of the outer profile of the object includes aspect ratio information of the outer profile of the object.

In another possible implementation manner of an embodiment of the subject application, preferably, the preset information of the object includes: information of a reference pattern in the object.

In a possible implementation manner of an embodiment of the subject application, preferably, before the step of determining whether a current image of an object is deformed relative to an original image of the object, the method includes:

acquiring the current image information of the object.

In another possible implementation manner of an embodiment of the subject application, preferably, the step of determining whether a current image of an object is deformed relative to an original image of the object includes:

generating corresponding deformation information according to depth information of the object relative to the imaging adjustment apparatus.

In a possible implementation manner of an embodiment of the subject application, preferably, before the step of determining whether a current image of an object is deformed relative to an original image of the object, the method includes:

acquiring the depth information of the object relative to the imaging adjustment apparatus.

Here, the acquiring the depth information of the object relative to the imaging adjustment apparatus may be acquiring at the side of the imaging adjustment apparatus recorded in the foregoing apparatus embodiment, or may also be acquiring at the side of the object.

In a possible implementation manner of an embodiment of the subject application, preferably, the step of generating imaging correction information corresponding to the deformation includes: generating the imaging correction information corresponding to the deformation according to the deformation information.

In a possible implementation manner of an embodiment of the subject application, preferably, the imaging lens group includes at least two lenses, and a part corresponding to each subregion of the at least one lens of the at least two lenses has an adjustable imaging parameter.

In a possible implementation manner of an embodiment of the subject application, preferably, the imaging parameter includes: a focal length.

In a possible implementation manner of an embodiment of the subject application, preferably, the imaging parameter further includes: relative positions of lenses.

In a possible implementation manner of an embodiment of the subject application, preferably, the plurality of subregions having adjustable imaging parameters is distributed in an array.

In a possible implementation manner of an embodiment of the subject application, preferably, the plurality of subregions having adjustable imaging parameters is distributed in a rectangular array.

In a possible implementation manner of an embodiment of the subject application, preferably, the plurality of subregions having adjustable imaging parameters is distributed in a radially concentric array.

In a possible implementation manner of an embodiment of the subject application, preferably, the method further includes: when a refractive error occurs on an imaging receiver, generating imaging correction information corresponding to the refractive error.

A person skilled in the art may understand that in the method of the specific implementation manner of the subject application, the sequence numbers of the steps do not mean a specific execution sequence, and the execution sequence of the steps should be determined based on the functions and internal logic thereof, rather to constitute any limitation on the implementation process of the specific implementation manner of the subject application.

The method in an embodiment of the subject application may be implemented by the apparatus embodiment above, and the specific implementation measures can be referred to the description of the apparatus embodiment above, which are no longer repeated here.

Figure 10:
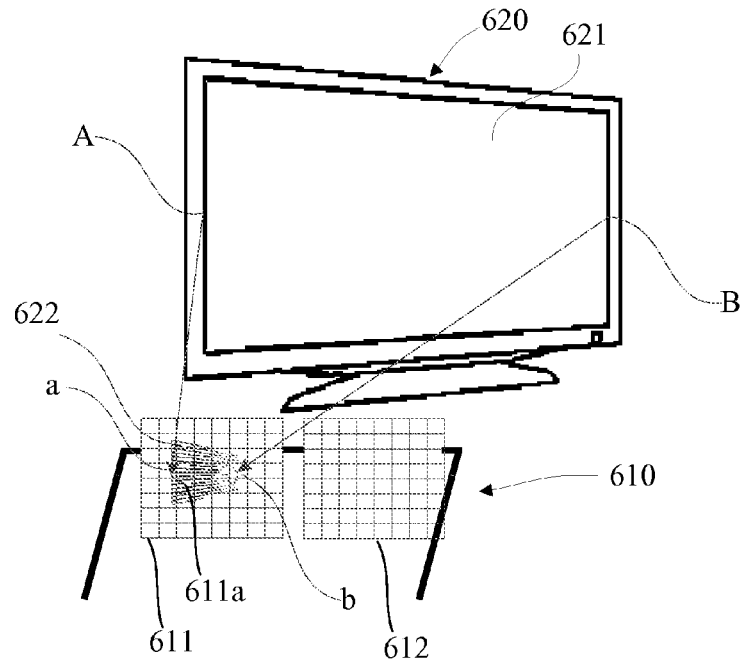
FIG. 10 is a schematic view of a projection of an object on an imaging lens group in an application of an imaging adjustment apparatus according to an embodiment of the subject application.

The implementation manners of apparatus and method embodiments of the subject application are further illustrated below using an example in which a user watches a screen with an intelligent glass device (that is, an imaging receiver is a viewer's eyes, and an imaging adjustment device is an intelligent glass device, and an object is a screen that displays an image):

As shown in FIG. 10, when a watching position of a viewer is not right in front or positions of a projector and a projection screen are not vertically aligned, a depth or image sensor (not shown in FIG. 10) on the intelligent glass device 610 captures a user's current watching environment in real time. In an imaging analysis module (not shown in FIG. 10), a classic image segmentation algorithm and a known screen parameter (such as the shape or aspect ratio of a screen) can be used to obtain a practical display part 621 of the screen 620 (the step belongs to the prior art, which is no longer described in detail in this implementation manner). Through the position of the viewer, the position of the intelligent glass device 610, and the position of the screen 620, the projection 622 of the screen display part 621 on the intelligent glass device 610 may be obtained. For example, in FIG. 10, a point a and a point b on the intelligent glass device 610 are intersections between connecting lines of a point A and a point B on the screen 620 and the eyes and the imaging lens group 611 on the left side of the intelligent glass device 610 (that is, the left lens), respectively. Next, a required correction parameter is calculated for subregions 611a covered by the projection 622, respectively. In the end, the calculation result is spread to the entire lens through a classic extrapolation algorithm to achieve a smooth transition effect. A similar method can be used for the imaging lens group 612 on the right side of the intelligent glass device 610 (that is, the right lens) to obtain a corresponding correction parameter. If the degree of correction is large, a parameter such as an optical axis 650 of a lens of each subregion of the two lenses further needs to be adjusted to keep the parallax of the left eye and right eye unchanged before and after correction.

Figure 11:
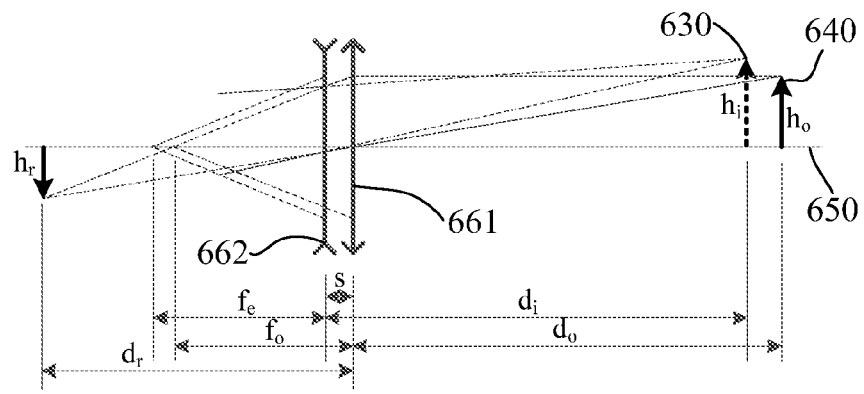
FIG. 11 is a schematic view of an optical path in an application of an imaging adjustment apparatus according to an embodiment of the subject application.
Figure 12A:
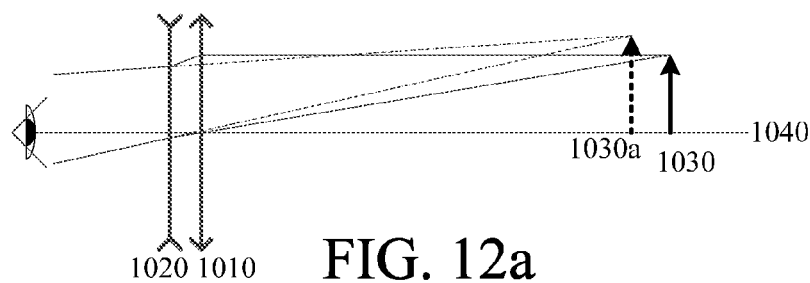
FIG. 12a to FIG. 12c are schematic views of changing the magnification factor and implementing focusing of an object by adjusting focal lengths of two lenses and a distance between the lenses.
Figure 12B:
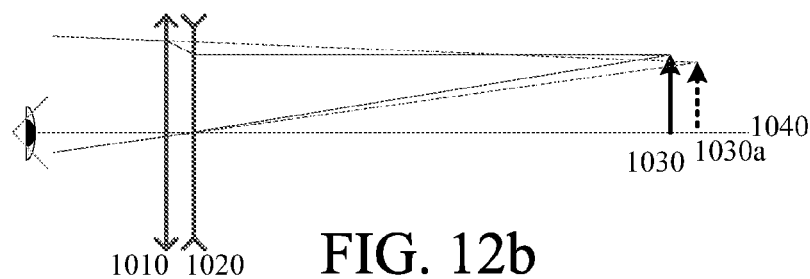
Figure 12C:
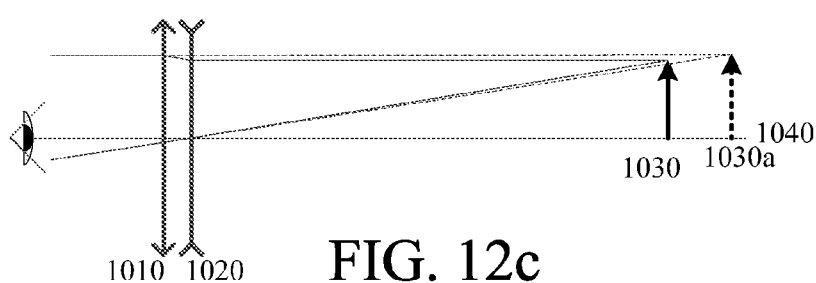

As shown in FIG. 11, when a depth sensor is used to obtain a depth view of a display screen to correct a deformation problem because the position of the viewer is not right in front, because the depth of each point on the screen may be obtained from the depth view, it can be obtained that the correction target function of any subregion of the imaging lens group covered by the projection is:

$$\begin{cases} h_i = h_o \\ d_i = \dfrac{d_{o,max} + d_{o,min}}{2} + s \end{cases} \quad (1)$$

where $h_i$ and $h_o$ are the sizes of a virtual image 630 and a practical object 640 (the screen in this implementation manner), respectively, $d_i$ is the distance of the virtual image, $d_{o,max}$ and $d_{o,min}$ the longest and shortest distances in the depth view of the practical object, for example, the depth of the point A and the depth of the point B in FIG. 10, and s is the distance between the first lens 661 near the practical object 640 and the second lens 662 near the viewer's eyes in the subregion.

By combining the lens imaging formula in the classic optical theory, formula (2) can be obtained:

$$\begin{cases} \dfrac{1}{d_o} + \dfrac{1}{d_r} = \dfrac{1}{f_o} \\ \dfrac{1}{d_r - s} + \dfrac{1}{d_j} = \dfrac{1}{f_e} \\ \dfrac{h_o}{h_i} = \dfrac{d_o}{d_r}, \dfrac{d_r - s}{d_i} \end{cases} \quad (2)$$

where $d_r$ is the distance from a real image 670 to the first lens 661 (in FIG. 11, $h_r$ is the size of the real image 670), $d_o$ is the distance from the practical object 640 to the first lens 661, and $f_c$ and $f_o$ are the values of the focal lengths of the second lens 662 and the first lens 661, respectively.

Because the distance s between the second lens 662 and the first lens 661 of the subregion may be obtained according to the mechanical structure of glasses, the correction information generation unit can eventually perform calculation according to formulas (1) and (2) to obtain the imaging parameter of the imaging lens group after the correction for the subregion, that is, the values of the focal lengths of the second lens 662 and the first lens 661 are $f_e$ and $f_o$:

$$\begin{cases} f_a = \dfrac{s \cdot d_o}{\Delta d} \\ f_e = \dfrac{s \cdot d_i}{\Delta d} \end{cases} \quad (3)$$

where $\Delta d = d_o - (d_i - s)$ is the distance between the practical object 640 and the corresponding virtual image 630, and $d_i$ can be obtained through calculation based on formula (1) and is a constant for the entire screen.

Therefore, by applying formula (3) on each subregion, the values of the focal lengths of the second lens 662 and the first lens 661 can be calculated. The lens adjustment module then adjusts the focal lengths of corresponding subregions of the first lens 661 and the second lens 662, so as to correct the deformation problem of the screen. When an image sensor is used to obtain a deformed image of a display screen to correct the deformation problem because the viewer's position is not right in front, the depth of each point on the screen can be derived from the deformed image and known shape information of the image, and therefore method similar to the above can be used to obtain an imaging parameter corresponding to each subregion.

FIG. 11 only shows the correction of a deformation in the height direction for the object. The deformation of the object in the width direction can also be corrected through the foregoing formula.

When an image sensor is used to obtain a deformed image of a display screen to correct a deformation problem because the direction of the projector is not right in front, the distance $d_o$ from the screen to the first lens between is a constant, $d_i$ in formula (1) can be modified into $d_o$, and a method similar to the above can also be used to obtain a corrected imaging parameter.

In conclusion, the method and apparatus of the subject application can correct an image deformation problem because the direction of projection is not right, thereby improving user experience.

Persons of ordinary skill in the art may further appreciate that, in combination with the examples described in embodiments herein, units and algorithm steps may be implemented by electronic hardware or a combination of computer software and electronic hardware. Whether these functions are performed using hardware or software depends on particular applications and design constraints of the technical solutions. A person skilled in the art may use different methods to implement the described functions for each specific application. However, such implementation should not be considered as beyond the scope of the subject application.

If implemented in the form of software functional units and sold or used as an independent product, the functions may also be stored in a computer readable storage medium. Based on this, a technical solution or the part that makes contributions to the prior art can be substantially embodied in the form of a software product. The computer software product may be stored in a storage medium and contain several instructions to instruct computer equipment (for example, a personal computer, a server, or network equipment) to perform all or a part of the steps of the method described in embodiments of the subject application. The storage medium may be any medium that is capable of storing program codes, such as a universal serial bus (USB) flash drive, a removable hard disk, a read-only memory (ROM), a RAM, a magnetic disk or an optical disk.

The above implementation manners are merely provided for describing the subject application, but not intended to limit the subject application. It should be understood by persons of ordinary skill in the art that various changes and variations can be made without departing from the spirit and scope of the subject application as defined by the claims of the subject application.

What is claimed is:

1. An apparatus, comprising:
a memory that stores executable instructions; and
a processor, coupled to the memory, that facilitates execution of the executable instructions to perform operations, comprising:
determining imaging correction information corresponding to correcting a deformation of a first image of an object from a first viewing angle relative to a second image of the object from a second viewing angle, wherein the deformation is a perspective deformation of the first image of the object relative to the second image of the object, wherein the perspective deformation results from an imaging receiver not being perpendicular to the object, and wherein the imaging receiver is an eye or an image recording device; and
adjusting at least one imaging parameter of a group of adjustable imaging parameters for at least one corresponding subregion of an imaging lens group used to cause the first image of the object from the first viewing angle, wherein the imaging lens group comprises a plurality of subregions having adjustable imaging parameters in the form of an array, wherein images, comprising the first image, formed by the imaging lens group are adaptable by adjusting portions of the imaging lens group to embody the group of adjustable imaging parameters, and wherein the adjusting the at least one imaging parameter corresponds to adjusting the first image of the object formed by the imaging lens group according to the imaging correction information resulting in an adjusted image, wherein:
the adjusted image is directed to the eye based on the adjusting the least one imaging parameter, and the imaging lens group is at least partially comprised in spectacles, or
the adjusted image is directed to the image recording device based on the adjusting the least one imaging parameter, and the image recording device comprises, at least in part, the imaging lens group.

2. The apparatus of claim 1, wherein the imaging correction information comprises deformation information corresponding to preset information attributed to the object.

3. The apparatus of claim 2, wherein the preset information of the object comprises shape information of an outer profile of the object.

4. The apparatus of claim 3, wherein the outer profile of the object is a rectangle, and the shape information of the outer profile of the object comprises aspect ratio information of the outer profile of the object.

5. The apparatus of claim 2, wherein the preset information of the object comprises information of a reference pattern in the object.

6. The apparatus of claim 2, wherein the determining the image correction information comprises:
determining, via an optical sensing device, the first image of the object from the first viewing angle.

7. The apparatus of claim 1, wherein the determining the image correction information comprises:
receiving, from a depth sensing device, depth information of the object.

8. The apparatus of claim 7, wherein the determining the image correction information comprises:
receiving, from a size sensing device, a size of the object.

9. The apparatus of claim 7, wherein the determining the image correction information comprises:
receiving, via an information receiving device of the apparatus, the depth information of the object from the depth sensing device.

10. The apparatus of claim 2, wherein the determining the image correction information comprises:
generating the imaging correction information to correct the first image based on the preset information attributed to the object.

11. The apparatus of claim 1, wherein the imaging lens group comprises a first lens and a second lens, wherein an optical attribute of the first lens is adjustable, and wherein adjustment of the optical attribute of the first lens affects imaging at a portion of the first image.

12. The apparatus of claim 1, wherein the at least one imaging parameter comprises a focal length.

13. The apparatus of claim 12, wherein the at least one imaging parameter further comprises relative positions of lenses of the imaging lens group.

14. The apparatus of claim 1, wherein the portions of the imaging lens group are distributed in an array.

15. The apparatus of claim 1, wherein the portions of the imaging lens group are distributed in a rectangular array.

16. The apparatus of claim 1, wherein the portions of the imaging lens group are distributed in a radially concentric array.

17. The apparatus of claim 1, wherein the determining the imaging correction information comprises:
determining refractive error correction information corresponding to correcting a refractive error at an imaging device for imaging the first image of the object.

18. The apparatus of claim 1, wherein the spectacles comprise all of the imaging lens group.

19. A method, comprising:
determining, by a system comprising a processor, whether a current image of an object corresponding to a first orientation of a current image sensor device to the current image is deformed according to a deformation relative to an original image of the object corresponding to a second orientation of an original image sensor device to the original image, and when the current image is deformed, generating imaging correction information corresponding to the deformation, wherein the deformation is a perspective deformation of the current image of the object relative to the original image of the object, wherein the perspective deformation results from an imaging receiver not being normal to the object, and wherein the imaging receiver is an eye or an optical energy recording device; and
adjusting at least one imaging parameter of at least one corresponding subregion of an imaging lens group according to the imaging correction information, wherein the imaging lens group comprises a plurality of subregions having adjustable imaging parameters in the form of an array, wherein:
the eye receives an adjusted image based on the adjusting the least one imaging parameter, and the imaging lens group is at least partially comprised in eyeglasses, or
the optical energy recording device receives the adjusted image based on the adjusting the least one imaging parameter, and the optical energy recording device comprises, at least in part, the imaging lens group.

20. The method of claim 19, wherein the determining whether the current image of the object is deformed relative to the original image of the object comprises:
determining whether the current image of the object is deformed relative to the original image of the object according to current image information of the object and preset information of the object, and when the deformation occurs, generating deformation information.

21. The method of claim 20, wherein the preset information of the object comprises shape information of an outer profile of the object.

22. The method of claim 21, wherein the outer profile of the object is a rectangle, and the shape information of the outer profile of the object comprises aspect ratio information of the outer profile of the object.

23. The method of claim 20, wherein the preset information of the object comprises information of a reference pattern associated with the object.

24. The method of claim 20, wherein the determining whether the current image of the object is deformed relative to the original image of the object comprises acquiring the current image information of the object via the current image sensor device.

25. The method of claim 19, wherein the determining whether the current image of the object is deformed relative to the original image of the object comprises generating corresponding deformation information according to depth information of the object relative to the current image sensor device.

26. The method of claim 25, wherein the determining whether the current image of the object is deformed relative to the original image of the object comprises acquiring the depth information of the object relative to the current image sensor device.

27. The method of claim 19, wherein the imaging lens group comprises at least two lenses, and wherein a part corresponding to each subregion of at least one lens of the at least two lenses has an adjustable imaging parameter of the adjustable imaging parameters.

28. The method of claim 19, wherein the at least one imaging parameter comprises a focal length value.

29. The method of claim 28, wherein the at least one imaging parameter further comprises relative position values of lenses of the imaging lens group.

30. The method of claim 19, wherein the plurality of subregions having the adjustable imaging parameters is distributed in an array.

31. The method of claim 19, wherein the plurality of subregions having the adjustable imaging parameters is distributed in a rectangular array.

32. The method of claim 19, wherein the plurality of subregions having the adjustable imaging parameters is distributed in a radially concentric array.

33. The method of claim 19, wherein the generating the image correction information comprises generating, in response to determining an instance of a refractive error occurring on the current image sensor, imaging correction information comprising correction information corresponding to the instance of the refractive error.

34. A computer readable storage device comprising executable instructions that, in response to execution, cause an image adjustment device comprising a processor to perform operations, comprising:
   in response to determining that a current image of an object is deformed, generating imaging correction information corresponding to a manner in which the image is deformed, wherein the determining that the current image is deformed is relative to an original image of the object, wherein a deformation of the current image of the object is a perspective deformation of the current image of the object relative to the original image of the object, wherein the current image of the object corresponds to a current viewing angle, wherein the original image of the object corresponds to an original viewing angle that is a different viewing angle than the current viewing angle, wherein the perspective deformation results from an imaging receiver not being orthogonal to the object, and wherein the imaging receiver is a human eye or an image recording device; and
   adjusting at least one imaging parameter of at least one corresponding subregion of a plurality of subregions of an imaging lens group according to the imaging correction information, resulting in an adjusted image, wherein the plurality of subregions are in the form of an array and have respective adjustable imaging parameters, wherein:
      the adjusted image is angled toward the human eye based on the adjusting the least one imaging parameter, and the imaging lens group is at least partially comprised in glasses, or
      the adjusted image is angled toward the image recording device based on the adjusting the least one imaging parameter, and the image recording device comprises, at least in part, the imaging lens group.

35. The computer readable storage device of claim 34, wherein the operations further comprise determining the current image via an image capture device at a position subjected to the current viewing angle.

* * * * *